United States Patent
Arakawa et al.

(10) Patent No.: US 6,621,550 B1
(45) Date of Patent: *Sep. 16, 2003

(54) GUEST-HOST LIQUID CRYSTAL DISPLAY DEVICE

(75) Inventors: Seiichi Arakawa, Kanagawa (JP); Masataka Matsute, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/941,302

(22) Filed: Sep. 30, 1997

(30) Foreign Application Priority Data

Oct. 4, 1996 (JP) .......................................... P08-283221

(51) Int. Cl.⁷ ............................................. G02F 1/1333
(52) U.S. Cl. ...................... 349/178; 349/117; 349/113
(58) Field of Search ................................. 349/178, 117, 349/165

(56) References Cited

U.S. PATENT DOCUMENTS

| | | | | |
|---|---|---|---|---|
| 4,252,417 A | * | 2/1981 | Scheffer et al. ............. | 350/349 |
| 4,266,859 A | * | 5/1981 | Togashi ...................... | 349/165 |
| 4,272,162 A | * | 6/1981 | Togashi et al. ............. | 349/117 |
| 4,490,015 A | * | 12/1984 | Kawarada et al. .......... | 349/178 |
| 5,574,593 A | * | 11/1996 | Wakita et al. .............. | 359/259 |
| 5,926,242 A | * | 7/1999 | Kataoka et al. ............. | 349/117 |

OTHER PUBLICATIONS

Birendra Bahadur, Liquid Crystals Applications and Uses, vol. 3, World Scientific Publishing Co., pp. 179–180, 1993.*
Bahadur, "Liquid Crystals: Applications and Uses", vol. 3, 1992, pp. 136, 180.*
Birendra Bahadur (editor), Liquid Crystals Applications and Uses, vol. 1, World Scientific Publishing Co., p. 233, 1993.*

* cited by examiner

Primary Examiner—Kenneth Parker
(74) Attorney, Agent, or Firm—Sonnenschein, Nath & Rosenthal

(57) ABSTRACT

The present invention provides a liquid crystal composition suitable for low-voltage driving of a guest-host liquid crystal display device. The guest-host liquid crystal display device has a pair of substrates bonded with a predetermined gap therebetween, a guest-host liquid crystal containing a dichroic dye and held in the gap, and a counter electrode and a reflecting electrode respectively provided on the substrates, for applying a voltage to the guest-host liquid crystal. The guest-host liquid crystal mainly comprises a nematic liquid crystal composition having a value of dielectric anisotropy within the range of −2 to −10, The molecules of the nematic liquid crystal are aligned vertically with respect to the upper and lower substrates.

13 Claims, 8 Drawing Sheets

| STRUCTURAL FORMURA | ABSORPTION MAXIMUM |
|---|---|
| C4H9—⟨benzene⟩—N=N—⟨thiazolothiazole⟩—N=N—⟨naphthalene⟩—N(C2H5)(C2H5) | 621-660nm |
| H9C4—⟨benzothiazole⟩—N=N—⟨benzene⟩—N=N—⟨naphthalene⟩—N=N—⟨benzene⟩—N(C2H5)(C2H5) | 591-606nm |
| C4H9—⟨naphthalene⟩—N=N—⟨benzene⟩—N-piperidine | 533-542nm |
| C4H9—⟨naphthalene⟩—N=N—⟨benzene⟩—OC2H5 | 439-446nm |

GUEST-HOST LIQUID CRYSTAL DISPLAY DEVICE

BACKGROUND OF THE INVENTION

1. Field of the Invention

The present invention relates to a guest-host liquid crystal display device. Particularly, the present invention relates to the composition of a nematic liquid crystal material as a host in which a dichroic dye serving as a guest is dissolved.

2. Description of the Related Art

A guest-host liquid crystal display device uses as an electro-optical material a guest-host liquid crystal in which a dichroic dye is dissolved in a nematic liquid crystal serving as a host. The alignment of the dichroic dye is controlled together with molecules of the nematic liquid crystal by the function of an electric field. The transmitted light of the guest-host liquid crystal display device can be controlled by the anisotropy of light absorption possessed by the dichroic dye. The types of gust-host liquid crystal display devices include a transmission type and a reflection type. In both cases, a black dichroic dye is used for white-black display. This display can be combined with a micro-color filter to obtain a full color image display. Therefore, as the dichroic dye, a black dye suitable for black display is generally selected. The guest-host liquid crystal is previously aligned horizontally or vertically in a cell, and switched to horizontal alignment or vertical alignment by turning a voltage on or off. When the liquid crystal has previously been aligned horizontally, the guest-host liquid crystal display device causes black display in the off state of the voltage, and is switched to the vertical alignment by turning the voltage on to cause white display. Conversely, when the liquid crystal has previously been aligned vertically, the absorption of the dichroic dye is decreased to form white display in the off state of the voltage. In the on state of the voltage, since the liquid crystal molecules and the dichroic dye are transferred to the horizontal alignment, absorption is increased to form black display.

Figure 8:
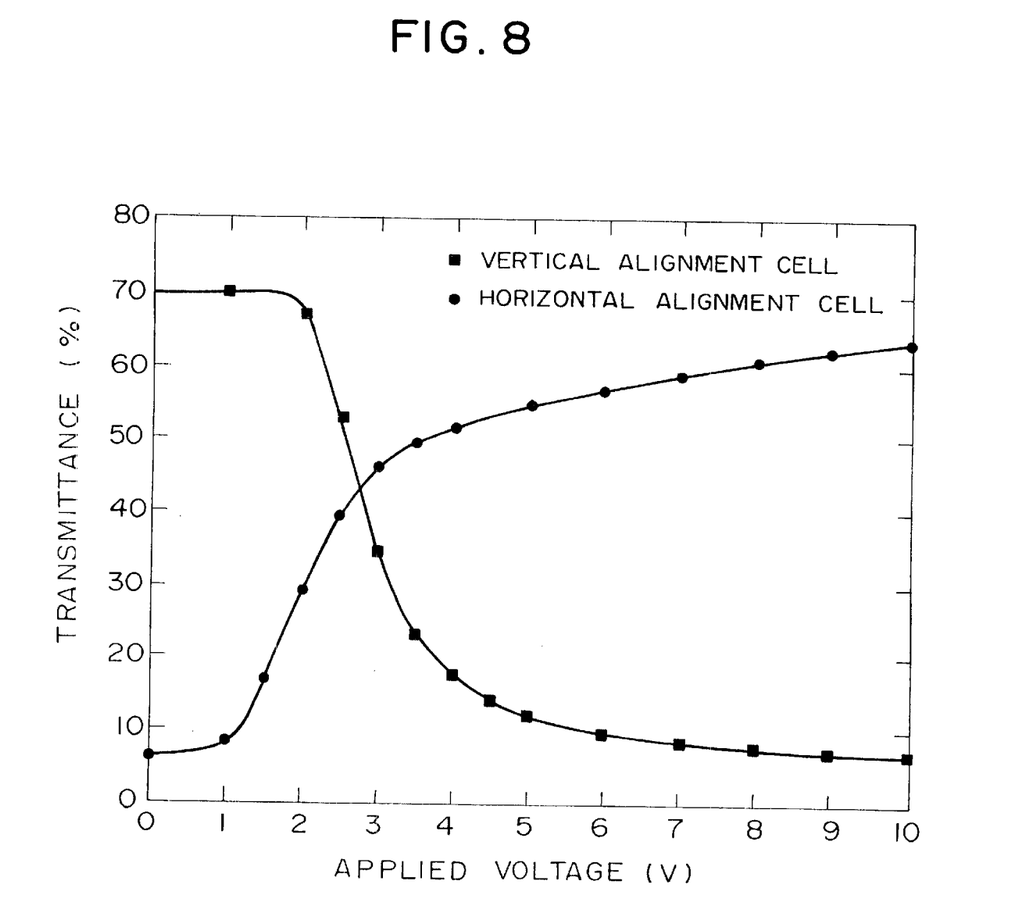
FIG. 8 is a graph showing the operation characteristics of a guest-host liquid crystal display device.

FIG. 8 shows the applied voltage/transmittance characteristics of guest-host liquid crystal display devices. In FIG. 8, the characteristics of a horizontal alignment cell are shown by black dots, and the characteristics of a vertical alignment cell are shown by black squares. In the horizontal alignment cell, the transmittance slowly increases as the applied voltage increases, and a high voltage must be applied for obtaining a sufficient level of white display. On the other hand, in the vertical alignment cell, the white level is high without application of a voltage, and a sufficient level of black display can be obtained by applying a relatively low voltage. Therefore, the vertical alignment cell is superior to the horizontal alignment cell for obtaining a high contrast by low-voltage driving. In the vertical alignment, the liquid crystal molecules has previously been aligned vertically without application of a voltage, and it is thus necessary to use a nematic liquid crystal material exhibiting the behavior that its molecules are aligned horizontally with application of a voltage. The liquid crystal material exhibiting such a behavior is required to have negative dielectric anisotropy as a basic requirement. In addition, the driving voltage decreases as the value of the negative dielectric anisotropy increases in the negative direction. However, it is difficult to control a liquid crystal to vertical alignment, and there are few liquid crystals having a large absolute value of negative dielectric anisotropy. Therefore, the vertical alignment cell is hardly brought into practical use.

SUMMARY OF THE INVENTION

In consideration of the problems of conventional techniques, an object of the present invention is to provide a guest-host liquid crystal display device using a host liquid crystal which can easily be aligned vertically and which has a large absolute value of negative dielectric anisotropy.

In order to achieve the object, the following means is provided. A guest-host liquid crystal display device of the present invention basically comprises a pair of substrates which are bonded with a predetermined gap therebetween, a guest-host liquid crystal containing a dichroic dye and held in the gap, and an electrode formed on each of the substrates, for applying a voltage to the guest-host liquid crystal. The guest-host liquid crystal display device is characterized in that the guest-host liquid crystal mainly comprises a nematic liquid crystal composition having a value of dielectric anisotropy within the range of $-2$ to $-10$, and has previously been aligned vertically with respect to the upper and lower substrates. The guest-host liquid crystal preferably contains a black dichroic dye, and is switched from an achromatic transmission state to an absorption state when applying a voltage, and a color filter is provided on one of the substrates to make the transmission state chromatic. Preferably, one of the substrates is transparent and is positioned on the incident side, and the other substrate is positioned on the reflection side and has a reflecting layer and a quarter wavelength plate layer which are formed in turn thereon.

In accordance with the present invention, the guest-host liquid crystal display device uses as an electro-optical material a liquid crystal composition having negative dielectric anisotropy, for example, a guest-host liquid crystal containing the black dichroic dye dissolved therein. The value of dielectric anisotropy is set within the range of $-2$ to $-10$. The guest-host liquid crystal has previously been aligned vertically in a cell to secure a sufficiently high level of white display without application of a voltage. With application of a voltage, the dichroic dye is aligned horizontally together with the liquid crystal molecules having negative dielectric anisotropy to realize a sufficiently low black level. This can provide a display with a good contrast. The guest-host liquid crystal display of the prevent invention can secure a threshold voltage Vth of about 2 V. Namely, the white display and black display are switched by turning on and off the applied voltage with the threshold voltage Vth of about 2 V as a boundary. It is, of course, possible to realize an intermediate tone display between both displays. In a guest-host liquid crystal display device using thin film transistors for switching and driving liquid crystal pixels, the voltage resistance of the thin film transistors is about 5 V, and thus low-voltage driving is preferred. In this case, the gust-host liquid crystal display device of the present invention having Vth of about 2 V can sufficiently be used for driving at 5 V. If the value of dielectric anisotropy $\Delta\epsilon$ is brought closer to zero from $-2$, Vth is undesirably increased to 2 V or more. Although Vth decreases as the value of dielectric anisotropy $\Delta\epsilon$ increases in the negative direction, there is no liquid crystal having a value $\Delta\epsilon$ of dielectric anisotropy larger than $-10$ in the negative direction within a practical range. Therefore, the limit of the value $\Delta\epsilon$ is about $-10$ from the viewpoint of limits of materials.

DESCRIPTION OF THE PREFERRED EMBODIMENT

Figure 1A:
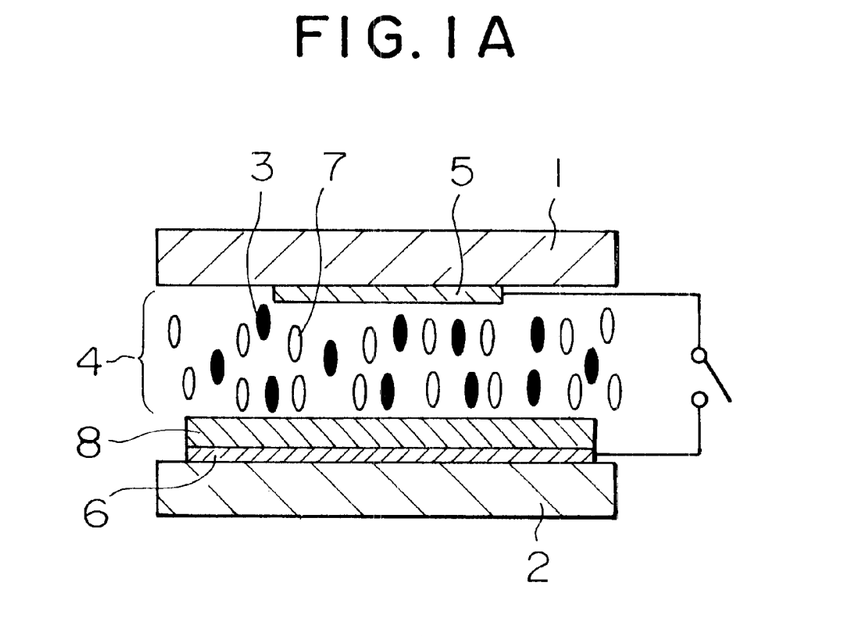
FIG. 1 is a schematic drawing showing the basic configuration of a guest-host liquid crystal display device of the present invention.
Figure 1B:
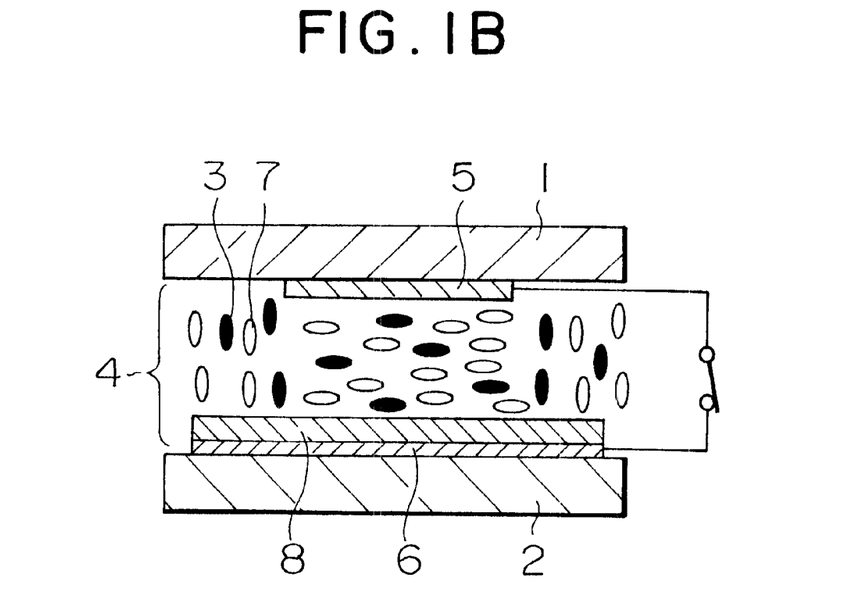

A preferred embodiment of the present invention will be described below with reference to the drawings. FIG. 1 shows the basic configuration of a guest-host liquid crystal display device of the present invention. FIG. 1A shows a state without application of a voltage (off state), and FIG. 1B shows a state with application of a voltage (on state). Referring to FIG. 1, the guest-host liquid crystal display device comprises a pair of substrates 1 and 2 bonded together with a predetermined gap therebetween, a guest-host liquid crystal 4 containing a dichroic dye 3 and held in the gap between both substrates 1 and 2, and a counter electrode 6 and a reflection electrode 6 which are formed on the substrates 1 and 2, respectively, for applying a voltage to the guest-host liquid crystal 4. The liquid crystal display device 1 is characterized in that the guest-host liquid crystal 4 mainly comprises a nematic liquid crystal composition having a value of dielectric anisotropy within the range of −2 to −10, and nematic liquid crystal molecules 7 are aligned vertically with respect to the upper and lower substrates 1 and 2. In this embodiment, the guest-host liquid crystal 4 contains 1 to 5% by weight of black dichroic dye. The content of the dichroic dye is more preferably within the range of 2 to 4% by weight. With an excessively high content, the problem of precipitation of crystals occurs at low temperatures, while with an excessively low content, a desired black display level cannot be obtained. The black dichroic dye 3 is dissolved in the guest-host liquid crystal 4, and thus the liquid crystal 4 changes from an achromatic transmission state (A) to an absorption state (B) in response to the application of a voltage, thereby obtaining a white-black display. In some cases, a color filter is provided on one of the substrates to make the transmission state chromatic, thereby obtaining a desired full-color display or multicolor display. In this embodiment, the upper substrate 1 is transparent and positioned on the incident side, and has a transparent counter electrode 5 formed on the inner surface thereof. Although not shown in the drawings, the counter electrode 5 is coated with an alignment film for vertical alignment. The lower substrate 2 is positioned on the opposite side and has a reflecting layer and a quarter wavelength plate layer 8 which are formed in turn thereon. In addition, the reflecting layer also serves as a reflecting electrode 6. The surface of the quarter wavelength plate layer 8 is also coated with an alignment film for vertical alignment.

In this embodiment, in order to obtain a high black-white contrast without using a polarizing plate, the reflecting layer (the reflecting electrode 6) and the quarter wavelength plate layer 8 are contained in a cell. As shown in FIG. 1A, in the off state, the guest-host liquid crystal 4 is aligned vertically, and the dichroic dye 3 does not absorb light to obtain high reflectance, thereby obtaining an ideal white display. On the other hand, when applying a voltage, as shown in FIG. 1B, the nematic liquid crystal molecules 7 are aligned horizontally together with the dichroic dye 3 to increase light absorption and decrease reflectance. This absorption change is enhanced by the quarter wavelength plate layer 8, and an ideal black display can be obtained. The reflection type guest-host liquid crystal display device having the above construction is used for monochromatic display. Alternatively, a color filter is provided on the outside of the display device to obtain full-color or multi-color display. Particularly, in an active matrix type display device comprising integrated thin film transistors formed for switching liquid crystal pixels, the guest-host liquid crystal 4 must be driven at a voltage of as low as 5 V or less from the viewpoint of the relation to the voltage resistance of the thin film transistors. In the vertical alignment cell, in order to easily realize low-voltage drive, a liquid crystal composition having a large absolute value of negative dielectric anisotropy is required. As a result of examination of various liquid crystal materials, it was found that within the range of dielectric anisotropy $\Delta\epsilon$ of −2 to −10, the threshold voltage Vth can be decreased to 2 V or less, and driving at a low voltage of 5 V is possible. If the $\Delta\epsilon$ value is lower than −2 in the negative direction, driving at a low voltage of 5 V or less is difficult. If the $\Delta\epsilon$ value is higher than −10 in the negative direction, the resistivity of the guest-host liquid crystal 4 is increased, and the voltage holding properties deteriorate. The phase transition point (NI point, the transition point between nematic phase and isotropic phase) is also decreased, and thus the operating temperature range of the liquid crystal is narrowed, or the temperature dependency deteriorates. This is undesirable for practical use.

Figure 2A:
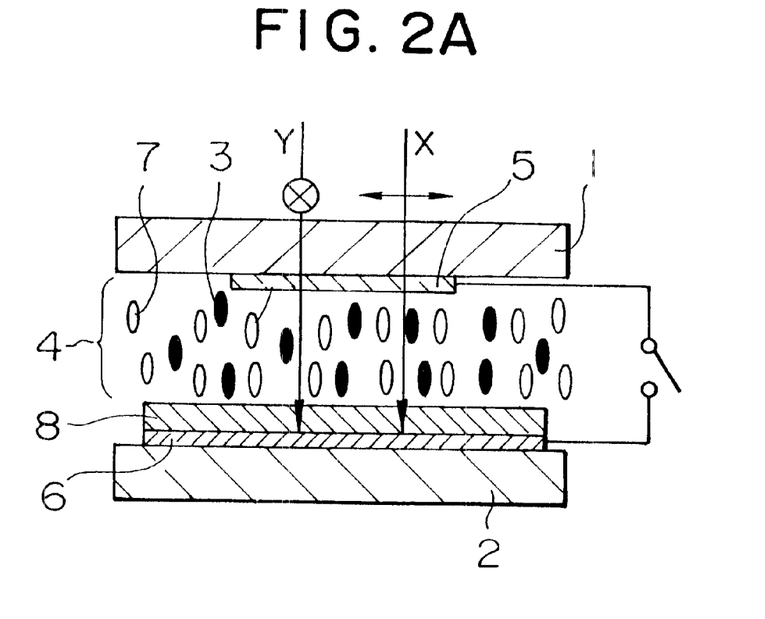
FIG. 2 is a schematic drawing illustrating the operation of the guest-host liquid crystal display device of the present invention.
Figure 2B:
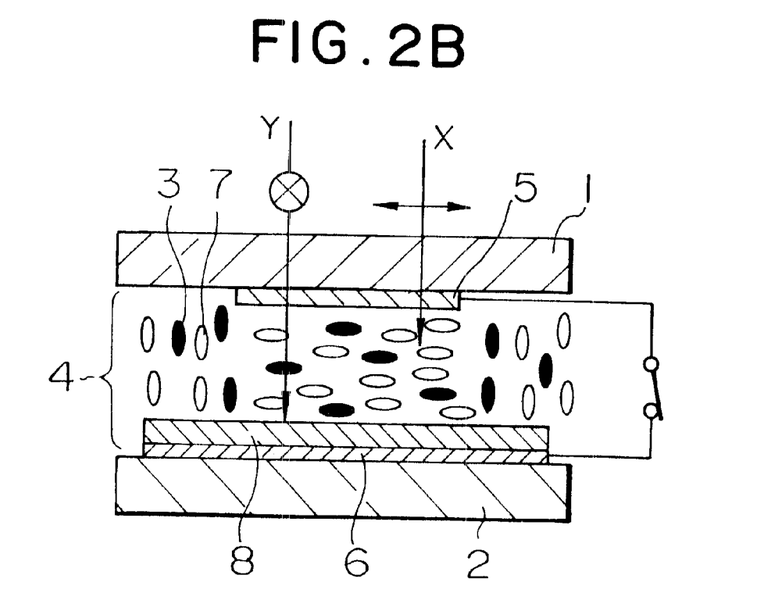

The operation of the guest-host liquid crystal display device of the present invention will be described in detail below with reference to FIG. 2. FIG. 2A shows a state without application of a voltage, and FIG. 2B shows a state with application of a voltage. The case of the vertical alignment state shown in FIG. 2A in which light is incident from the outside is first considered. Incident light can be considered as being divided into vibration components X and Y as polarized light components which cross at right angles. The vibration component X is linearly polarized light parallel to the drawing, and the vibration component Y is linearly polarized light perpendicular to the drawing. The nematic liquid crystal molecules 7 are aligned vertically, and accordingly the dichroic dye 3 is also aligned vertically. Therefore, both vibration components X and Y are entirely transmitted through the guest-host liquid crystal layer 4. Namely, in this embodiment, the dichroic dye 3 is the p type and an absorption axis substantially parallel to the molecular axis thereof, and thus the vibration components X and Y perpendicular to the absorption axis are hardly absorbed by the dichroic dye 3. Although both vibration components X and Y which are entirely transmitted through the guest-host liquid crystal 4 are reflected by the reflecting electrode 6, the vibration components X and Y are just interchanged without being modulated. On the other hand, when applying a voltage, the gust-host liquid crystal layer 4 is transferred to horizontal alignment, as shown in FIG. 2B. In this case, the vibration component X is in the same direction as the alignment direction of the guest-host liquid crystal layer 4, and is thus absorbed by the black dichroic dye 3 aligned in the same direction. However, the vibration component Y is transmitted through the guest-host liquid crystal layer 4, and then enter the quarter wavelength plate layer 8. The vibration component Y is further reflected by the reflecting electrode 6, and again passed through the quarter wavelength plate layer 8. Consequently, the vibration component Y passes twice through the quarter wavelength plate layer 8 in the forward and backward travels, and thus the polarization direction is rotated for 90°. As a result, the vibration component Y is in the same direction as the alignment direction of the guest-host liquid crystal layer 4, and thus absorbed. In this way, all vibration components of the incident light are absorbed in the forward or backward travel, to obtain a contrast equal to that of a transmission type guest-host liquid crystal display device with a polarizing plate even if no polarizing plate is provided.

Figure 3:
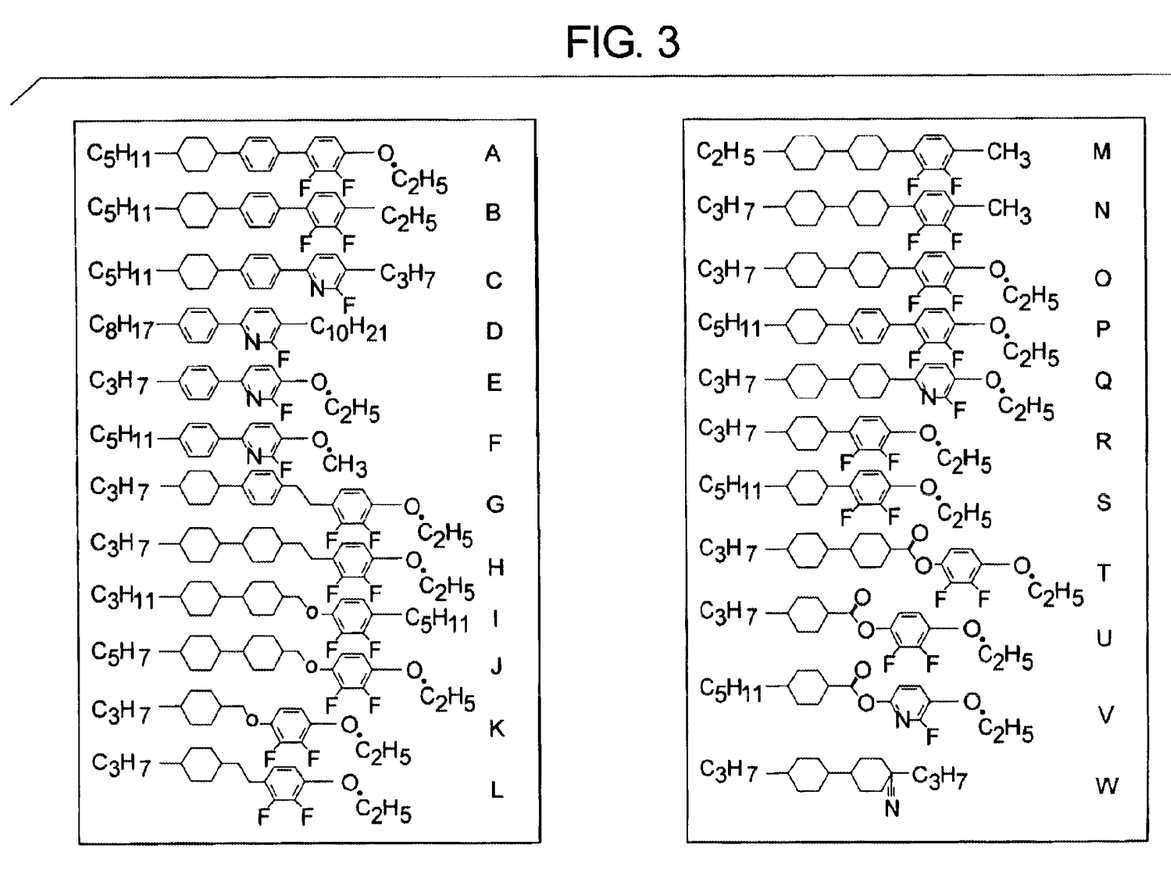
FIG. 3 is a table showing a list of nematic liquid crystal materials used for the guest-host liquid crystal display device of the present invention.

Development of liquid crystal materials having negative dielectric anisotropy has been conventionally progressed to some extent, and such liquid crystal materials are disclosed in, for example, Japanese Patent Unexamined Publication Nos. 60-199840 and 4-224885. The present invention uses liquid crystal materials having $\Delta\epsilon$ within the range of −2 to −10, which are listed in FIG. 3. Most of these liquid crystal materials are fluorine type nematic liquid crystals, and have $\Delta\epsilon$ within the range of −2 to −10, as described above. However, these liquid crystal materials show variations in other important properties such as the NI point and voltage holding properties. In the present invention, therefore, liquid crystal materials are appropriately selected from the liquid crystal materials A to W shown in FIG. 3 and blended to obtain a desired liquid crystal composition. For example, liquid crystal materials B, H, M, O, P, S, T, etc. are appropriately selected from the materials shown in FIG. 3 to obtain liquid crystal compositions having a relatively high NI point and excellent voltage holding properties. Examples of such liquid crystal compositions are shown as liquid crystals 1 to 4 in Table 1.

TABLE 1

|  | Liquid crystal 1 | Liquid crystal 2 | Liquid crystal 3 | Liquid crystal 4 |
| --- | --- | --- | --- | --- |
| Dielectric anisotropy ($\Delta\epsilon$) | −3.87 | −4.60 | −5.12 | −6.39 |
| NI point (° C.) | 86.2 | 80.5 | 84.7 | 84.7 |
| $\Delta n$ | 0.0816 | 0.0800 | 0.0938 | 0.0943 |
| Resistivity ($\Omega \cdot$ cm) | $2.4 \times 10^{12}$ | $6.7 \times 10^{12}$ | $2.0 \times 10^{12}$ | $1.3 \times 10^{12}$ |
| V10 (V) | 2.5 | 2.2 | 1.9 | 1.7 |
| V90 (V) | 4.9 | 4.7 | 4.2 | 4.0 |

The liquid crystals 1 to 4 shown in the table have $\Delta\epsilon$ within the range of −2 to −10. The NI points of these liquid crystals are within the range of 80 to 90° C., and thus a relative high operating temperature range is secured. The values of refractive index anisotropy are within the range of 0.08 to 0.10, and the resistivity values are of the order of $10^{12}$. The threshold voltages are within the range of 1.7 to 2.5 V and 4.0 to 4.9 V at V10 (V) and V90 (V), respectively. Therefore, these liquid crystals 1 to 4 enable driving at a voltage of as low as 5 V or less. In this table, V10 represents the applied voltage corresponding to the intermediate 10 level, and V90 represents the applied voltage corresponding to the intermediate 90 level, on the assumption that the white level is 0, and the black level is 100.

Figure 4:
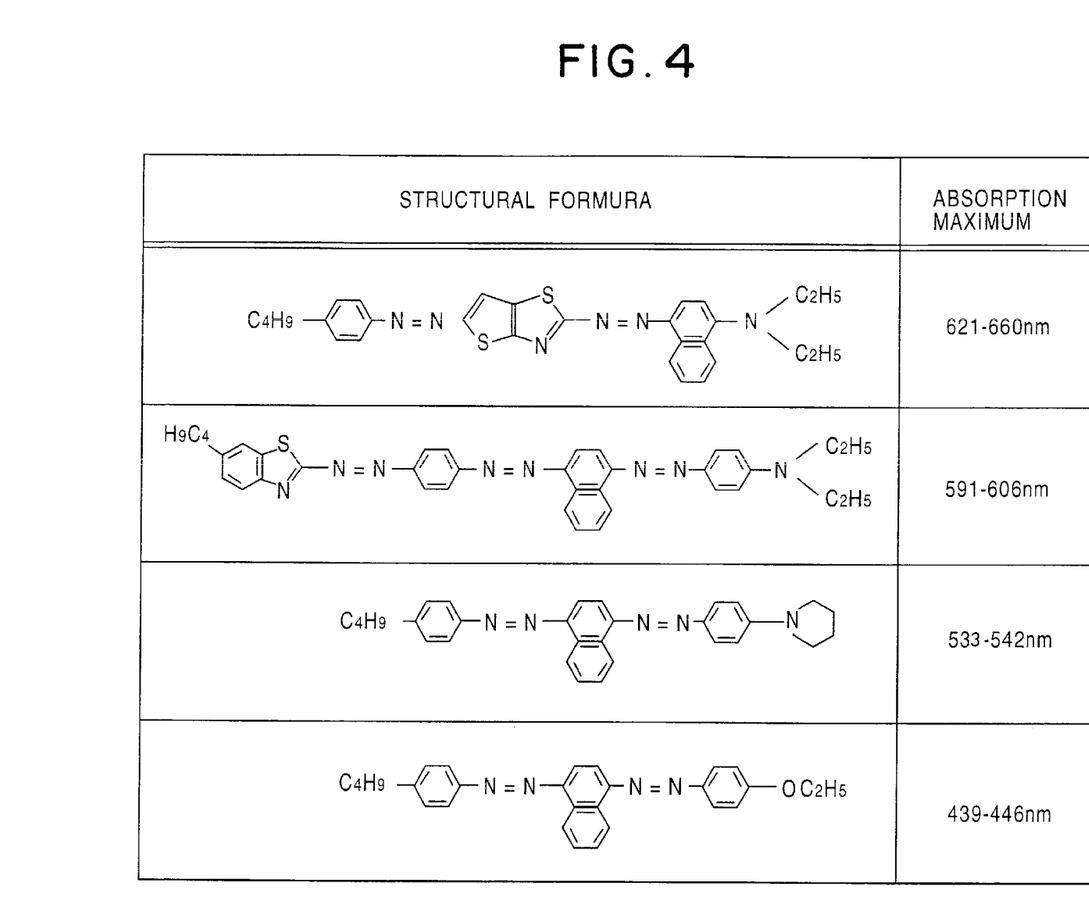
FIG. 4 is a table showing dichroic dyes used for the guest-host liquid crystal display device of the present invention.
Figure 5:
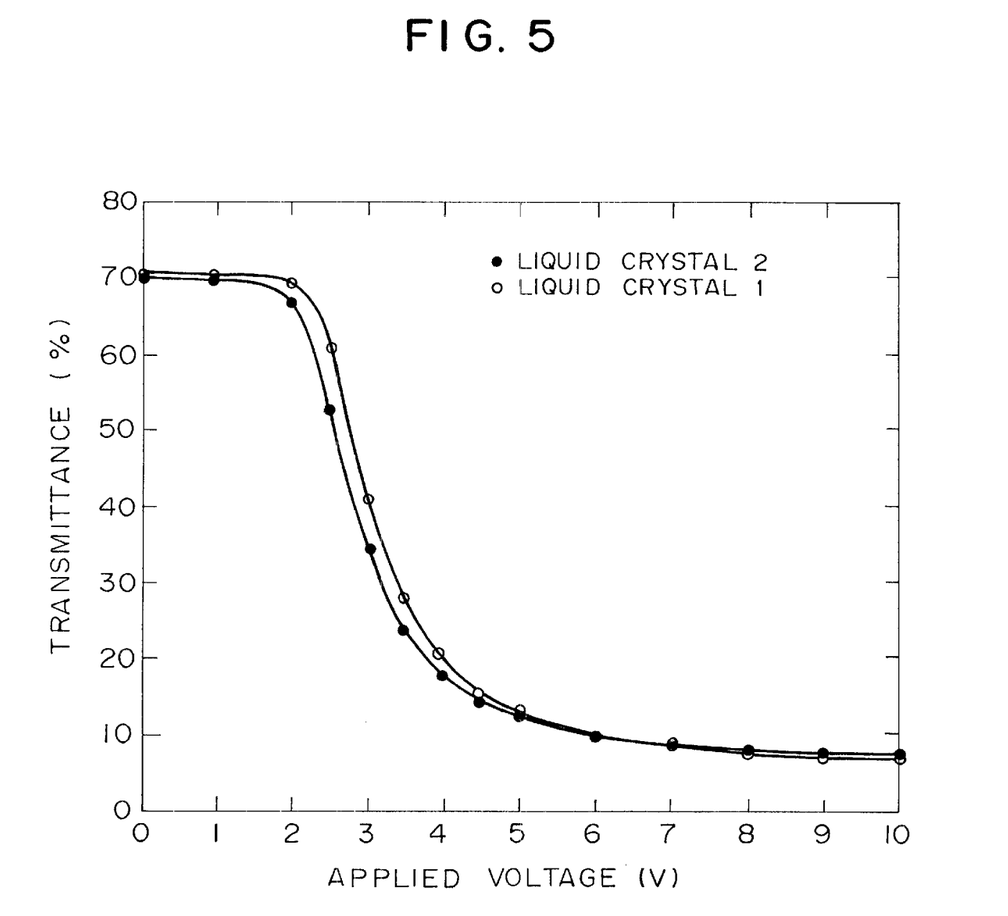
FIG. 5 is a graph showing the applied voltage/transmittance characteristics of the guest-host liquid crystal display device of the present invention.
Figure 6:
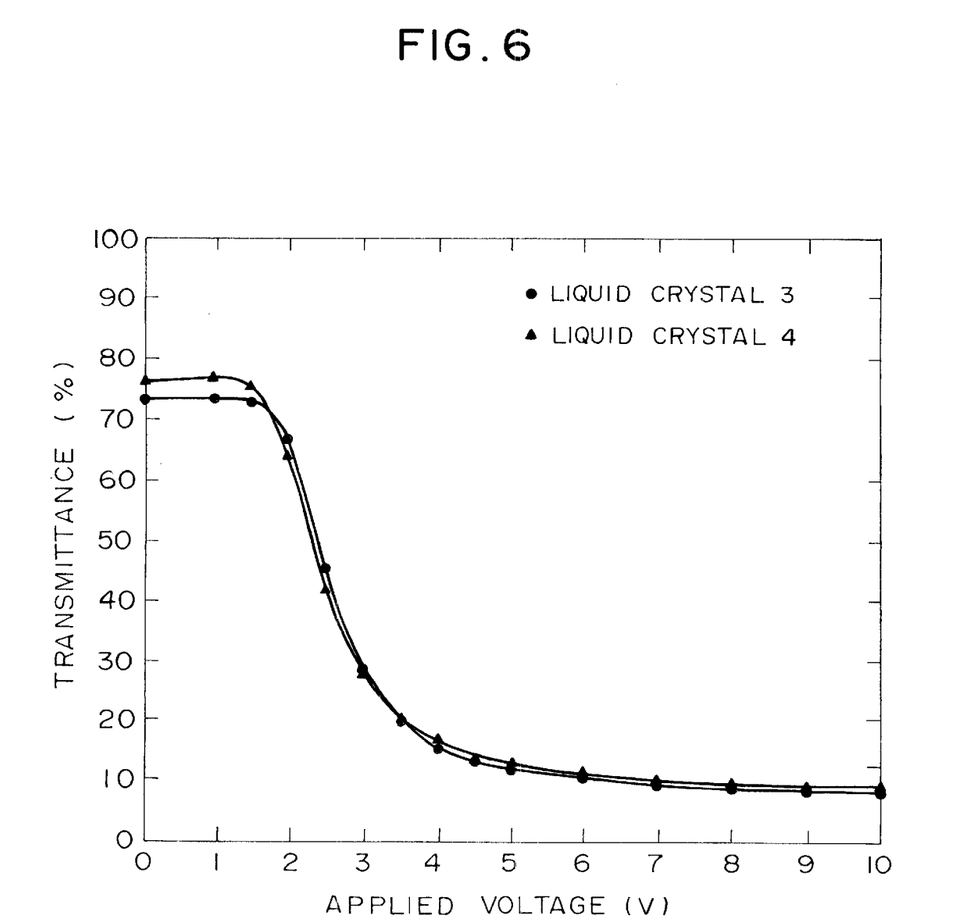
FIG. 6 is a graph showing the applied voltage/transmittance characteristics of the guest-host liquid crystal display device of the present invention.

3% by weight of black dichroic dye was dissolved in each of the four types of liquid crystals 1 to 4 shown in the above table to prepare guest-host liquid crystals. As the black dichroic dye, a composite black dye obtained by mixing the four types of monochromatic and dichroic dyes shown in FIG. 4 was used. The four types of dichroic dyes had respectively absorption maximums of 621 to 660 nm, 591 to 606 nm, 533 to 542 nm and 439 to 446 nm. In order to evaluate the thus-prepared guest-host liquid crystals, liquid crystal cells for testing were formed. A pair of glass substrates on each of which a transparent electrode was formed were bonded with a gap of 5 $\mu$m therebetween to form an empty cell. Each of the transparent electrodes was coated with a vertical alignment film and then rubbed. Into the cell was injected the guest-host liquid crystal, and the electro-optical properties were exhibited by using a polarizing plate. An AC voltage (frequency 60 Hz) was applied to each of the liquid crystal cell samples, and changes in transmittance with the applied voltage were examined. The results obtained are shown in FIGS. 5 and 6. For all liquid crystals 1 to 4, it is found that a large change in transmittance is shown at the time of switching between the on and off states of the applied voltage, and a high contrast can be obtained. It is also found that the threshold value of the liquid crystal composition having a higher value of $\Delta\epsilon$ in the negative direction is shifted to the low-voltage side.

Figure 7:
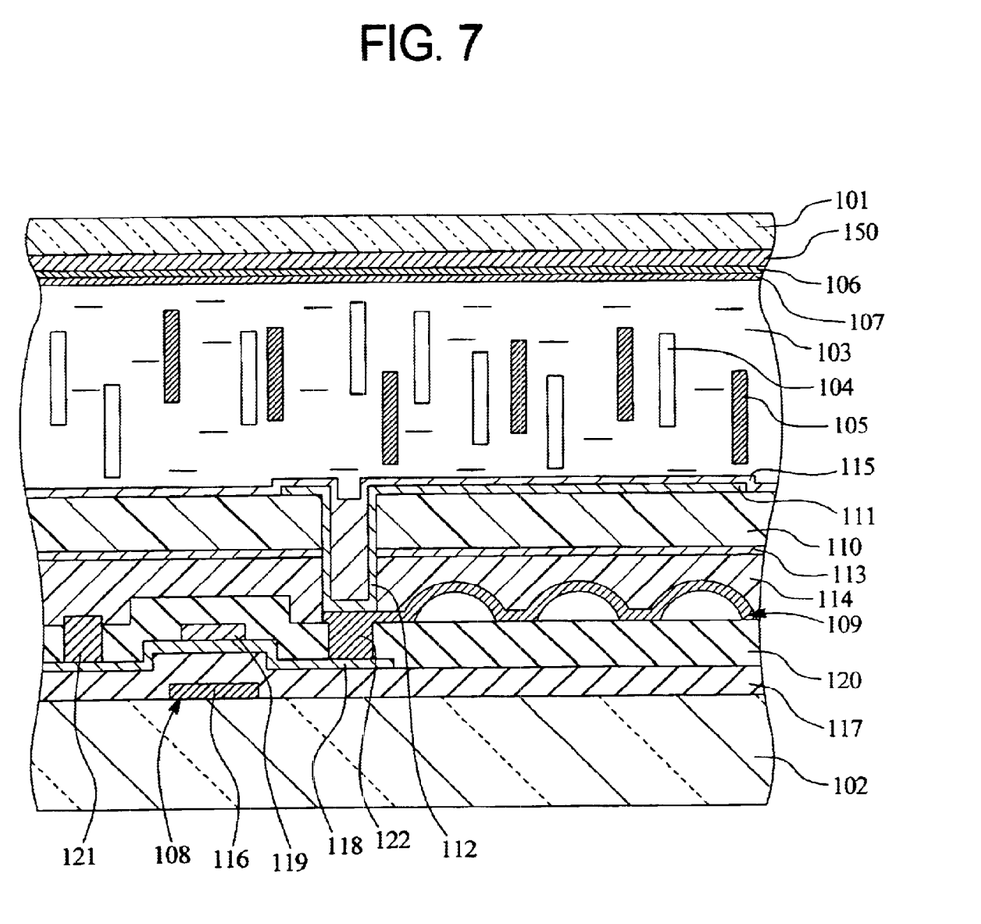
FIG. 7 is a partially sectional view showing an example of the construction of the guest-host liquid crystal display device of the present invention.

Finally, an example of the construction of the guest-host liquid crystal display device of the present invention is described with reference to FIG. 7. This example is a reflection type in which a reflecting layer and a quarter wavelength plate layer are contained, and an active matrix type in which integrated thin film transistors are formed for switching and driving pixels. The display device also comprises a micro color filter and thus permits full color display. As shown in FIG. 7, the display device comprises a pair of upper and lower substrates 101 and 102 which are bonded with a predetermined gap therebetween. The upper substrate 101 is positioned on the incident side and comprises a transparent substrate of glass or the like. On the other hand, the lower substrate 102 is positioned on the reflection side and need not comprise a transparent material. A guest-host liquid crystal 103 is held between the pair of substrates 101 and 102. The guest-host liquid crystal 103 mainly comprises nematic liquid crystal molecules 104 having negative dielectric anisotropy, and contains, for example, 3% by weight of black dichroic dye 105. Specifically, the guest-host liquid crystal 103 mainly comprises a nematic liquid crystal composition having dielectric anisotropy within the range of −2 to −10. In this example, the liquid crystal 2 shown in Table 1 is used. The nematic liquid crystal molecules 104 are aligned vertically with respect to the upper and lower substrates 101 and 102. On the inner surface of the upper substrate 101 are formed in turn a micro color filter 150, a counter electrode 106, and an alignment layer 107. The counter electrode 106 comprises a transparent electrically conductive film of ITO or the like. The alignment layer 107 comprises, for example, a polyimide film for vertically aligning the guest-host liquid crystal 103. As described above, the guest-host liquid crystal 103 contains the black dichroic dye 105, and changes from the achromatic transmission state to the absorption state in response to the application of a voltage. The micro color filter 150 makes the transparent state chromatic (color) for each pixel unit. This enables full color display.

On the lower substrate 102 are formed at least a switching element comprising a thin film transistor 108, a light reflecting layer 109, a quarter wavelength plate layer 110 and a pixel electrode 111. In the basic construction, the quarter wavelength plate layer 110 is deposited on the thin film transistor 108 and the reflecting layer 109, and has a contact hole 112 communicated with the thin film transistor 108. The pixel electrode 111 is patterned on the quarter wavelength plate layer 110. It is thus possible to apply a sufficient electric field to the guest-host liquid crystal 103 between the pixel electrode 111 and the counter electrode 106. The pixel electrode 111 is electrically connected to the thin film transistor 108 through the contact hole 112 formed in the quarter wavelength plate layer 110.

Each of the elements will be described in detail below. In this example, the quarter wavelength plate layer 110 comprises a monoaxially aligned polymeric liquid crystal film. In order to monoaxially align the polymeric liquid crystal film, an under alignment layer 113 is provided. A flattening layer 114 for removing unevenness of the thin film transistor 108 and the reflecting layer 109 is provided, the under alignment layer 113 being formed on the flattening layer 114. The quarter wavelength plate layer 110 is also deposited on the surface of the flattening layer 114. In this case, the pixel electrode 111 is connected to the thin film transistor 108 through the contact hole 112 which is formed to pass through the quarter wavelength plate layer 110 and the flattening layer 114. The reflecting layer 109 is finely divided corresponding to the respective pixel electrodes 111. Each of the divided portions of the reflecting layer 10 is connected to the corresponding pixel electrode 111 at the same potential. The above construction prevents the application of an unnecessary electric field to the quarter wavelength plate layer 110 and the flattening layer 114 which are interposed between the reflecting layer 109 and the pixel electrodes 111. The reflecting layer 109 is provided with a scattering reflecting surface, as shown in the drawing, for preventing mirror reflection of incident light to improve image quality. An alignment layer 115 is formed to coat the surface of the pixel electrode 111 and contact the guest-host liquid crystal in order to control the alignment thereof. In this example, the guest-host liquid crystal 103 is aligned vertically by the alignment layer 115 together with the opposite alignment layer 107. The thin film transistor 108 has a bottom gate structure, and has a laminated structure comprising a gate electrode 116, a gate insulating film 117 and a semiconductor film 118 which are formed in turn. The thin film transistor 118 comprises, for example, polycrystalline silicon, the channel region aligned to the gate electrode being protected by a stopper 119 from the above. The bottom gate type thin film transistor 108 having the above structure is coated with an interlayer insulating film 120. In the interlayer insulating film 120 are formed a pair of contact holes through which a source electrode 121 and a drain electrode 122 are connected to the thin film transistor 108. These electrodes 121 and 122 are formed by patterning aluminum. The drain electrode 122 has the same potential as the reflecting layer 109. The pixel electrode 111 is electrically connected to the drain electrode 122 through the contact hole 112. On the other hand, to the source electrode 121 is supplied a signal voltage such as a video signal or the like. In fact, when video signals were input to display an image, a clear moving image is displayed, and a screen with a high contrast could be obtained.

As described above, in the present invention, the guest-host liquid crystal mainly comprises a nematic liquid crystal composition having a value of dielectric anisotropy within the range of −2 to −10, and is aligned vertically with respect to the upper and lower substrates. In such a guest-host liquid crystal display device using a liquid crystal having negative dielectric anisotropy and aligned vertically, a high level of white display can be obtained. When a black dye having high absorption properties and dichroic ratio is selected, the black display level can be decreased. As a result, a display with a high contrast can be realized. In addition, when the dielectric anisotropy is increased in the negative direction, driving at a voltage of as low as 5 V or less becomes possible.

What is claimed is:

1. A guest host liquid crystal display device, comprising:
   (a) first and second substrates positioned with a gap therebetween, the first and second substrates each having an interior surface facing the gap;
   (b) a guest host liquid crystal within the gap dispersed in a homeotropic geometry;
   (c) a reflecting layer within the gap and the first substrate;
   (d) a quarter wavelength plate layer within the gap;
   (e) first and second electrodes respectively provided on the inner surfaces of the first and second substrates so that a voltage can be applied to the guest host liquid crystal via the electrodes;
   (f) wherein the guest host liquid crystal mainly comprises a nematic liquid composition having a value of a negative dielectric anisotropy within a range of −2 to −10; a black dichroic dye dispersed in the liquid crystal that changes from an achromatic transmission state to an absorption state in response to the application of a voltage, the dye being 1–5% by weight of the liquid crystal;
   (g) the crystal composition is aligned to be perpendicular with respect to the surfaces of the upper and lower substrates when no voltage is applied across the electrodes.

2. The guest host liquid crystal display device of claim 1, wherein the liquid crystal contains a color filter is provided on one of the substrates to make the transmission state chromatic.

3. The guest host liquid crystal display device of claim 1, wherein one of the substrates is transparent and positioned on the incident side, and the other substrate is positioned on the reflection side and has a reflecting layer and a quarter wavelength plate layer which are formed in turn thereon.

4. The guest host liquid crystal device of claim 1, wherein an applied voltage of less than five voltages substantially eliminates a transmissive characteristic of the liquid crystal material.

5. The guest host crystal display device of claim 1, wherein the reflecting layer is the first electrode.

6. The guest host crystal display device of claim 1, wherein the second electrode is transparent.

7. The guest host crystal display device of claim 1, wherein the second electrode is coated with an alignment film for vertical alignment.

8. The guest host crystal display device of claim 1, wherein the quarter wavelength plate layer is coated with an alignment film for vertical alignment.

9. A guest host liquid crystal display device, comprising:
   (a) first and second substrates positioned with a gap therebetween, the first and second substrates each having an interior surface facing the gap;
   (b) a guest host liquid crystal within the gap dispersed in a homeotropic geometry;
   (c) a reflecting layer within the gap and the first substrate;
   (d) a quarter wavelength plate layer within the gap and adjacent the reflecting layer;
   (e) first and second electrodes respectively provided on the inner surfaces of the first and second substrates so that a voltage can be applied to the guest host liquid crystal via the electrodes;

(f) wherein the guest host liquid crystal mainly comprises a nematic liquid composition having a value of a negative dieletric anisotropy within a range of −2 to −10; a black dichroic dye dispersed in the liquid crystal that changes from an achromatic transmission state to an absorption state in response to the application of a voltage, wherein the applied voltage of less than five voltages substantially eliminates a transmissive characteristic of the liquid crystal material;

(g) the crystal composition is aligned to be perpendicular with respect to the surfaces of the upper and lower substrates when no voltage is applied across the electrodes.

(h) a color filter provided on one of the substrates to make the transmission state chromatic;

(i) wherein one of the substrates is transparent and positioned on the incident side, and the other substrate is positioned on the reflection side and has a reflecting layer and a quarter wavelength plate layer which are formed in turn thereon.

10. The guest host crystal display device of claim 9, wherein the reflecting layer is the first electrode.

11. The guest host crystal display device of claim 9, wherein the second electrode is transparent.

12. The guest host crystal display device of claim 9, wherein the second electrode is coated with an alignment film for vertical alignment.

13. The guest host crystal display device of claim 9, wherein the quarter wavelength plate layer is coated with an alignment film for vertical alignment; wherein the reflecting layer is the first electrode; wherein the second electrode is transparent; wherein the second electrode is coated with an alignment film for vertical alignment; and wherein the quarter wavelength plate layer is coated with an alignment film for vertical alignment.

* * * * *